United States Patent
Bacinschi

(10) Patent No.: US 9,928,043 B2
(45) Date of Patent: Mar. 27, 2018

(54) USER-DRIVEN EVOLVING USER INTERFACES

(71) Applicant: Radim Bacinschi, Vancouver (CA)

(72) Inventor: Radim Bacinschi, Vancouver (CA)

(73) Assignee: SAP SE, Walldorf (DE)

( * ) Notice: Subject to any disclaimer, the term of this patent is extended or adjusted under 35 U.S.C. 154(b) by 345 days.

(21) Appl. No.: 14/506,422

(22) Filed: Oct. 3, 2014

(65) Prior Publication Data

US 2016/0098172 A1    Apr. 7, 2016

(51) Int. Cl.
*G06F 3/14* (2006.01)
*G06F 9/44* (2018.01)

(52) U.S. Cl.
CPC . *G06F 8/38* (2013.01); *G06F 8/36* (2013.01)

(58) Field of Classification Search
CPC . H04L 41/22; G06F 3/0481; G06F 17/30867; G06F 3/0482; H04N 1/00501; H04N 1/00509; H04N 1/00517; H04N 21/4755
USPC .............. 715/866, 719, 744, 771; 706/11
See application file for complete search history.

(56) References Cited

U.S. PATENT DOCUMENTS

| | | | |
|---|---|---|---|
| 2010/0057646 A1* | 3/2010 | Martin | G06F 19/3487 706/11 |
| 2012/0060094 A1* | 3/2012 | Irwin | H04N 21/4314 715/719 |
| 2014/0108985 A1* | 4/2014 | Scott | G06F 3/0484 715/771 |
| 2014/0325374 A1* | 10/2014 | Dabrowski | G06F 9/4443 715/744 |

OTHER PUBLICATIONS

"Cascading Style Sheets," available at http://en.wikipedia.org/wiki/Cascading_Style_Sheets, 25 pages, last accessed Jul. 15, 2014.
Dato-on, et al., "Customizing SharePoint Sites and Portals: Part 1," available at http://msdn.microsoft.com/en-us/library/dd583126(v=office.11).aspx, 10 pages, last accessed Jul. 30, 2014.
Dato-on, et al., "Customizing SharePoint Sites and Portals: Using Templates and Site Definitions, Part 2," available at http://msdn.microsoft.com/en-us/library/ms916803.aspx, 15 pages, last accessed Jul. 20, 2014.
Dato-on, et al., "Customizing SharePoint Sites and Portals: Style Sheet Class Reference Tables, Part 3," available at http://msdn.microsoft.com/en-us/library/ms916805.aspx, 29 pages, last accessed Jul. 30, 2014.

(Continued)

*Primary Examiner* — Ruay Ho
(74) *Attorney, Agent, or Firm* — Klarquist Sparkman, LLP

(57) ABSTRACT

The described technologies can be used for customizing and evolving user interfaces. In one embodiment, a method can comprise storing a default graphical user interface template. A user-customized graphical user interface template can be stored in a repository of user-customized graphical user interface templates. A popularity of the user-customized graphical user interface template can be measured. The popularity of the user-customized graphical user interface template can be incorporated into a graphical user interface selection process.

20 Claims, 10 Drawing Sheets

(56) References Cited

OTHER PUBLICATIONS

Anderson, "Customizing Word user interface," available at http://www.add-in-express.com/creating-addins-blog/2013/07/17/customizing-word-user-interface/, 9 pages, last accessed Jul. 30, 2014.
"How to move icons on an iPhone," available at http://www.ehow.com/how_5102460_move-icons-iphone.html, 3 pages, last accessed Jul. 15, 2014.
"Properties file," available at http://en.wikipedia.org/wiki/.properties, 3 pages, last accessed Jul. 30, 2014.
SAP AG, "BI Launch Pad User Guide," available at http://help.sap.com/businessobject/product_guides/boexir4/en/xi4_bip_iv_en.pdf, 170 pages, Mar. 14, 2012, last accessed Jul. 15, 2014.

\* cited by examiner

USER-DRIVEN EVOLVING USER INTERFACES

BACKGROUND

A user interface can be the primary method that a user of a software program interacts with the software program. Software programs that have highly usable, user-friendly interfaces are typically more desirable to a user and can provide a competitive advantage to a software vendor when the user interface is well designed. Thus, software vendors can spend considerable resources on researching and experimenting with the usability of their programs, causing potentially increased development costs and slower release cycles.

However, even when the software vendor creates a well-designed interface for one individual user, a different individual may prefer a different interface. Currently, typical user interfaces provide minimal customization so each user is constrained to use essentially the same interface as every other user. Further, user expectations and skills change over time and so it may be desirable for the user interface to also change over time. However, changing the user interface can be time-consuming and expensive for the developer and the user must typically wait for the next release cycle to see any changes to the user interface. Thus, it can be challenging for a software vendor to evolve a user interface in line with the needs of an individual user and the needs of a community of users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a method can comprise storing a default graphical user interface template. The default graphical user interface template can comprise multiple customizable elements having default settings and capable of being customized by a user. A user-customized graphical user interface template can be stored in a repository of user-customized graphical user interface templates. The user-customized graphical user interface template can comprise one or more customized elements that differ from the default graphical user interface template. Popularity of the user-customized graphical user interface template can be measured. The popularity of the user-customized graphical user interface template can be incorporated into a graphical user interface selection process.

In another embodiment, one or more computer-readable storage media can comprise computer-executable instructions causing a computing system to perform a method. The method can comprise displaying a plurality of candidate user-customized graphical user interface templates for selection. Displaying the candidate templates can incorporate a popularity of at least one of the candidate user-customized graphical user interface templates. A selection of a selected user-customized graphical user interface template can be received. The selection of the selected user-customized graphical user interface template can be out of the plurality of candidate user-customized graphical user interface templates. The selected user-customized graphical user interface template can be implemented locally.

In another embodiment, a computing device can be configured to perform a method. The method can comprise entering a graphical user interface selection mode and transmitting a request for candidate user-customized graphical user interface templates. Respective candidate user-customized graphical user interface templates can define at least one characteristic of a page of a software application. The request can include one or more user attributes associated with the user. The candidate user-customized graphical user interface templates can be received. The candidate user-customized graphical user interface templates can be popular among users having one or more of the transmitted user attributes associated with the user. Respective candidate user-customized graphical user interface templates can be ranked from more popular to less popular. The page of the software application can be displayed as defined by respective candidate user-customized graphical user interface templates. The page can be displayed as defined by the more popular candidate user-customized graphical user interface templates before the less popular candidate user-customized graphical user interface templates. The page can be updated when the user swipes between the more popular and the less popular candidate user-customized graphical user interface templates. A selection can be received of a selected user-customized graphical user interface template from the candidate user-customized graphical user interface templates. The selected user-customized graphical user interface template can be implemented locally.

The foregoing and other objects, features, and advantages of the invention will become more apparent from the following detailed description, which proceeds with reference to the accompanying figures.

DETAILED DESCRIPTION

Overview

Figure 1:
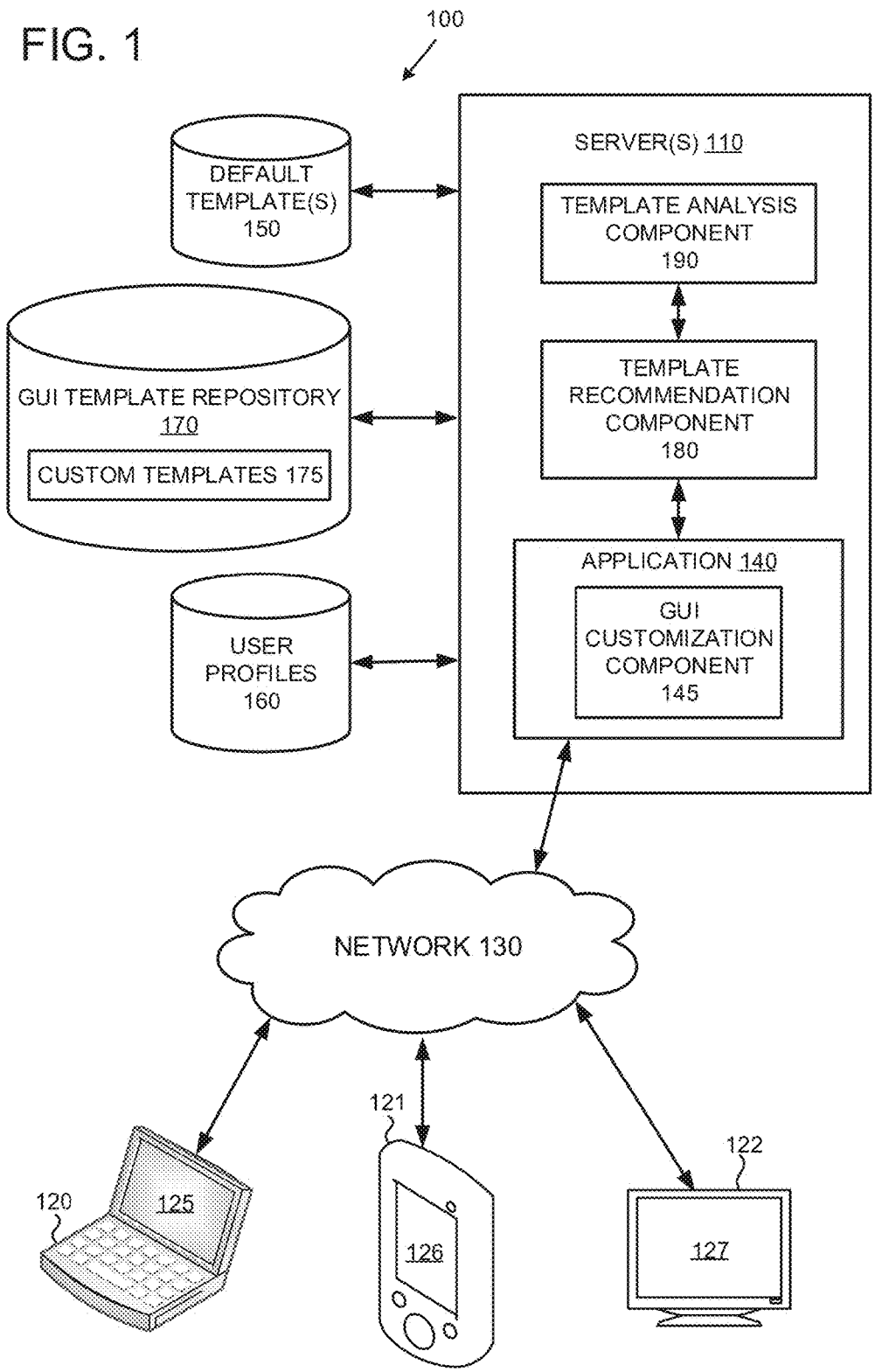
FIG. 1 is a block diagram of an example system implementing a user-driven customizable evolving user interface.

A user may want to interact with a software application in a way that best suits that user. For example, a user may desire to customize a user interface with particular types or sets of controls, different viewing options, or with a particular color scheme. The range of desired customization may vary between users. Some users may want a highly customized user interface, other users may want minor customizations, and still other users may be satisfied with the default user interface. However, when the desires of a community of users are viewed as a whole, some features of the user interface will be more desirable or popular with the community.

A software vendor may want to evolve the user interface so that it incorporates the most popular features and trends of the user community. For example, the vendor may want to change the default look, feel, and operation of the user interface to incorporate the most popular aspects of customized user interfaces. However, several factors may complicate the vendor's efforts to update the user interface, such as: users may be unable to propagate their feedback back to the vendor and so the vendor may be unaware of problems or successes with the user interface; user desires are dynamic and so the vendor's efforts may lag current user desires due to the time-consuming development cycle of software; and one community of users may desire a user interface that is largely different from a different community of users.

The technologies described herein can be used for customizing and evolving user interfaces with little or no ongoing development support by a software vendor. In an exemplary system, properties affecting the look, feel, and operation of a user interface can be defined with a graphical user interface (GUI) template. The GUI template can include multiple customizable elements having default settings and being capable of customization by a user. When no template has been defined for a user, the user interface can look and operate in the default manner as defined by one or more default GUI templates. A user may choose to make manual customizations and the customizations can be stored in a user template associated with the user. User-customized GUI templates can be stored in a repository of GUI templates. Other users can select from the GUI templates in the repository to take advantage of the efforts of the community of users.

The GUI templates can be stored in association with attributes of the user that created or selected a respective GUI template. Exemplary user attributes can include gender, age, marital status, occupation, salary level, hobbies, nationality, political affiliation, religious affiliation, or other attributes suitable for the application. The popularity of the customized elements of the GUI templates and the popularity of the customized GUI templates can be measured using various statistical methods. The popularity can be based on all users of the application and/or on a particular community of users.

The measured popularity can be used in at least two ways: (1) evolving the default GUI template(s), and (2) helping a user to select a GUI template that is suitable for the user. First, a default GUI template can be evolved by periodically changing the default elements of the GUI template based on a popularity measure of respective customized elements of the GUI template. For example, the default configuration of a GUI element for choosing from a list of items can be a drop-down list. However, if many users are customizing the GUI element to be radio buttons, e.g., radio buttons are a popular customization of the GUI element, then the default configuration of the GUI element can be modified to be radio buttons. Thus, users that use the default configuration can benefit from a user interface that is evolving based on input from the community of users.

Second, a user may prefer to use someone else's customizations of the user interface. For example, the application can have a mode that allows the user to select from the GUI templates that are stored in the GUI template repository. A subset of the GUI templates may be presented to the user based on the popularity of the templates and/or based on one or more user attributes. For example, the user may request to see the most popular GUI templates used by German engineers. The application can present GUI templates matching the criteria of the user, the user can browse through the GUI templates, and the user can select one of the GUI templates. Upon selection, the user can use a user interface with the look, feel, and operation of the selected GUI template.

By periodically updating elements of the user interface with the most popular customizations from the GUI template repository, the user interface can evolve in a way that is beneficial to the application users. The software vendor can automatically receive feedback from the users and the user interface can evolve without major development efforts by the software vendor. The user feedback can be timely so that a vendor does not have to wait for poor reviews of the application and/or disappointing sales to realize that the application could benefit from a different user interface. Finally, users can use the application in the manner that suits them when the users are able to customize the user interface of the application.

Example System Implementing a User-Driven Evolving User Interface

FIG. 1 is a block diagram of an example system 100 implementing a customizable evolving user interface. The system 100 can include one or more computer servers 110 connected over a communications network 130 to one or more client devices, such as client devices 120-122, for example. The client devices 120-122 can include various types of clients, such as desktop computers, laptops, tablets, smartphones, set-top boxes, game consoles, and smart televisions running web browsers and/or other lightweight client applications. The client devices 120-122 can include various types of input and output devices which can be used to implement a user interface of an application 140 executing on the servers 110. For example, the laptop 120 can include a moderately sized display 125, a keyboard, and a capacitive mouse. As another example, the personal electronic device 121 can include a small display 126 with a touch screen and one or more mode buttons. As yet another example, the smart television 122 can include a large screen 127 and a remote control (not shown).

The network 130 can include a local area network (LAN), a Wide Area Network (WAN), the Internet, an intranet, a wired network, a wireless network, a cellular network, combinations thereof, or any network suitable for providing a channel for communication between the servers 110 and the client devices 120-122. It should be appreciated that the network topology illustrated in FIG. 1 has been simplified and that multiple networks and networking devices can be utilized to interconnect the various computing systems disclosed herein.

The application 140 can include a graphical user interface for interfacing with a user. The graphical user interface can include one or more pages for presenting information to the user. The pages can include various images, text, windows, controls, and other information suitable for communicating with the user. The look, feel, and operation of the graphical user interface can be defined by one or more GUI templates.

A GUI template can be associated with a single page, a portion of a page, or multiple pages of the application 140. The GUI template can be hierarchical so that one GUI template can instantiate one or more other GUI templates. Default GUI template(s) 150 can be used to define the look and feel of the graphical user interface when a user starts the application 140 for the first time. For example, the software vendor can create the one or more default graphical user interface template(s) 150 as the application 140 is being developed. Respective default template(s) 150 can include one or more customizable elements having default settings and capable of being customized by a user. The customizable elements can correspond to the set of information and controls for the software application 140. The customizable elements of the default template(s) 150 can determine a size and position of windows of the application; the font, size, and color of text; the presence, absence, or functionality of various features; the color of foreground and background items; the position of various controls; the types of various controls (e.g., radio buttons, drop-down menu, etc.); and other aspects of the graphical user interface. By providing different default templates with different features, the application 140 can have a different default look and feel based on the default template that is used.

The default template(s) 150 can be stored in association with user attributes so that different communities or types of users can have different default user interfaces. For example, respective users of the application 140 can be assigned a user identifier and a user profile which can be stored in user profiles 160. Respective user profiles can include one or more user attributes, such as access-level, security-level, name, gender, age, marital status, employer, school, occupation, salary level, hobbies, nationality, political affiliation, religious affiliation, or other attributes suitable for the application. For example, the application 140 can support different categories of users, such as premium and base users. A default template for premium users can define a user interface including more features or features with increased functionality as compared to a default template for base users. As another example, one default template can be associated with engineers and a different template can be associated with managers. The user attributes can be defined by the software vendor, defined by the users, or a combination of the two. For example, the application 140 can provide a form for the user to fill in with user attributes during a registration process. Respective user profiles can also include links or references to one or more of the default template(s) 150 and/or custom templates 175 stored in the GUI template repository 170.

The default template(s) 150, the user profiles 160, and the GUI template repository 170 can be stored in memory, a storage device, or a combination of the two. The tangible memory can be volatile memory (e.g., registers, cache, RAM), non-volatile memory (e.g., ROM, EEPROM, flash memory, etc.), or some combination of the two, accessible by the server(s) 110. The storage can be removable or non-removable, such as magnetic disks, direct-attached storage, network-attached storage (NAS), storage area networks (SAN), redundant arrays of independent disks (RAID), magnetic tapes or cassettes, CD-ROMs, DVDs, or any other medium which can be used to store information in a non-transitory way and which can be accessed by the server(s) 110.

The application 140 can include a GUI customization component 145 that enables the user to customize the user interface of the application 140. Specifically, the GUI customization component 145 can allow the user to change the graphical user interface from the default user interface to a customized user interface. The GUI customization component 145 can provide at least two methods for customizing the user interface of the application 140: the user interface can be manually customized, or the user interface can be customized by selecting a pre-customized template, such as one of the custom templates 175 from the GUI template repository 170.

The user interface of the application 140 can be manually customized. For example, a manual customization workflow or mode can be entered responsive to receiving an indication to enter the mode. For example, the user can click a "customize" button, select a "manual custom" tab, or gesture in a manner associated with entering the manual customization mode from within the application 140. Customizations can include: moving GUI controls on the page, such as by dragging and dropping controls of the user interface; changing a control type, such as by selecting a new compatible control type (e.g., changing from radio buttons to a pull-down menu); changing foreground or background colors, such as by selecting a color from a color palette; changing fonts, such as by selecting a new font from a list of available fonts; changing a position of a group of controls; restricting data sets for inputs or outputs of the application; restricting data sets permitted for the controls; adding or removing elements to/from the page; and other changes that are suitable for the application 140.

The GUI customization component 145 can capture the user's customizations, create a new custom template associated with the customized user interface, and store or upload the custom template to the GUI template repository 170. For example, the user can start with the default interface defined by one of the default templates. A local copy of the default template can be created. The user customizations can be captured by changing the default settings of the customizable elements of the local copy of the default template to match the customizations made by the user. When the user is finished customizing the user interface, the local copy of the customized template can be stored as one of the custom templates 175 of the GUI template repository 170. A link or reference to the customized template can be stored with the user profile so that the customized user interface appears the next time that the user runs the application 140. One or more properties of the user (e.g., user attributes) can be stored in association with the customized template so that consumers of the custom templates can use the properties to discover templates used by others with similar properties. For example, people of a certain age range (e.g., between the ages of eighteen and twenty-two) can find templates stored by others of the same age range.

The GUI customization component 145 can include an interface for administrators to control the amount of customization that is available for a user or a group of users. For example, an enterprise administrator may choose to lock some parts of the user interface so that a user within the enterprise can only customize a subset of elements on the page. The administrator can also have the option to pre-customize the user interface by creating a default template (selected from one or more of the default template(s) 150 or the custom templates 175) for a user group under administration.

The user interface of the application 140 can be customized by the user selecting a pre-customized template through a GUI selection process. For example, a GUI-selection mode can be entered by the user clicking a "customize" button or selecting a "select template" tab from within the application 140. Once the GUI-selection mode is entered, one or more recommendations can be provided to the user by a template recommendation component 180. The template recommendations can be selected from and be based on the popularity of the default template(s) 150 and/or the custom templates 175 of the GUI template repository 170. For example, the template recommendation component 180 can present the recommended templates to the user in order, from more popular to less popular.

The template analysis component 190 can analyze the stored templates (e.g., the default template(s) 150 and the custom templates 175) to measure the popularity of the respective stored templates. The popularity can be measured in a number of ways that can be used separately or combined. For example, the popularity of a particular stored template can be based on tracking a number of users that have selected the particular stored template. The popularities of the different stored templates can be ranked from most used to least used to determine an ordering of popular templates. The ranking can include, exclude, or weight the popularity of the default template(s) 150 compared to the popularity of the custom templates 175. The popularity of the default template(s) 150 may be down-rated because, on the one hand, many users may choose to stay with the default template(s) 150 and so the popularity of the default template(s) 150 may be overstated. On the other hand, the default template(s) 150 may be well designed and so the popularity of the default template(s) 150 may be accurate, especially as the application 140 and its user interface matures.

As another example, the popularity can be personalized to a particular user based on the user attributes associated with the stored template and one or more user attribute values associated with the particular user. For example, the user profile of a particular user can include demographic attributes (e.g., of an unmarried female teenager). The popularity of stored templates used by others of the same demographic attributes can be weighted more heavily for this particular user as compared to the stored templates used by users with different attributes. A subset of user attributes can be used to personalize the popularity for a particular user. For example, the teenager and/or female attributes may correlate much stronger with a desirable template than the unmarried attribute. Thus, some attributes can be weighted more heavily than other attributes and some attributes can be excluded all together. The template analysis component 190 can analyze the stored templates and their associated user attributes to determine a correlation between user attributes and the stored templates. The correlation can be used when personalizing the popularity of the stored templates to a particular user.

As yet another example, the popularity can be personalized to a particular user based on the user attributes associated with the stored templates, user attribute values associated with the particular user, and ratings provided by other users selecting a respective stored template having one or more of same user attribute values as the particular user. For example, ratings can be based on a percentage of satisfaction or a ten point or five point scale to provide a measure of a user's satisfaction with the stored template. The rating can be provided by the user at various times. For example, the rating can be provided when the user selects or creates the stored template; the rating can be provided as the user is using the stored template; and the rating can be solicited from the user once or periodically by the template analysis component 190. The popularity of a stored template can be personalized to a particular user based on the user's rating of other previously used templates.

As yet another example, the popularity can be based on user attributes associated with the stored templates and search criteria supplied by a particular user. The search criteria can include user attributes and the search results can return stored templates that are popular amongst users with the user attributes. The search criteria can include one or more desired features of the stored template. For example, the user can search for stored templates with a stock ticker and the search results can return stored templates with stock tickers, weighting the results toward stored templates with stock tickers that are popular amongst users with the user attributes. The search criteria can include additional features associated with the stored template, such as when the stored template was created or a theme of the stored template. The popularity of a stored template can be personalized to a particular user based on other user-supplied criteria. For example, the user could select the method or algorithm used to determine the popularity of the stored templates.

Summarizing, the template analysis component 190 can analyze the stored templates (e.g., the default template(s) 150 and the custom templates 175) to measure the popularity of the respective stored templates in a number of ways that can be used separately or combined. Exemplary results returned by the template analysis component 190 can include: a most widely used template; a most highly reviewed template; popular templates in a geographical region (such as the most common template in Germany, the United States, or Canada); popular templates by a user's job category (such as for sales, for administrators, or for managers); popular templates created on a date and/or time; popular templates associated with a theme (such as Halloween) or weather type (such as rainy, hot, or cold); and a list of the most commonly customized elements (such as controls, colors, or fonts) and the templates they belong to.

The GUI selection process can include selecting a template from the default template(s) 150 that has been automatically evolved. For example, the template analysis component 190 can analyze the stored templates to determine popular customized elements of the stored templates, and can modify or create new default templates based, at least in part, on the popularity of the stored templates. For example, some elements of the stored templates may be customized in a similar manner across many users, while other elements of the stored templates may be left in the default state or customized in uncorrelated ways across the users. The default template(s) 150 can be modified or evolved so that the popular and common customizations become the default states of one or more new or modified default template(s) 150. For example, if 90% of the customizable elements are generally the same for a large number of users (such as 60% of the users) then a default template can be created to capture the preference of the community of users. Thus, most users may be satisfied with a lower level of customization (e.g., the 10% of customizable elements with no correlation between the users) than if the preference of the community of users was not taken into account.

The evolution of the default template(s) 150 can be automatic by having a new or modified default template be created periodically (such as once a month) or when a stored template or an element of a stored template reaches a popularity threshold (such as a 90% approval rating). As one specific example, automatically evolving the default GUI template can comprise changing the default setting of a customizable element of the default GUI template to match a customized setting of a corresponding customizable element of the user-customized GUI template. By evolving the default template(s) 150, new users of the application 140 can be presented with a user interface that has been tested by and approved by the community of users of the application 140. Automation of the process can allow the default template(s) 150 to evolve faster and with fewer resources than if the software vendor were to research and prototype potential changes without automation.

The evolved default template(s) 150 can be associated with one or more user attributes. For example, the template analysis component 190 can analyze the stored templates to determine whether particular customized elements of the stored templates are common or popular among users having one or more user attributes. For example, when it is detected that users with a first user attribute prefer a different customization than users with a different, second user attribute, a first default template can be created for users with the first user attribute, and a second default template can be created for users with the second user attribute.

The evolved default template(s) 150 can be automatically applied or can be recommended to a particular user, but not applied until the user consents. For example, a user of a default template can experience a change in the user interface of application 140 when the default state of a customizable element of the default template is directly modified. However, some users may not like the user interface changing without their knowledge. Thus, a new default template including the evolved default state of a customizable element of the default template can be created, and the template recommendation component 180 can prompt the user before changing the user to the new default template.

In practice, the systems shown herein, such as system 100, can vary in complexity, with additional functionality, more complex components, and the like. For example, additional components can be included to implement security, redundancy, load balancing, report design, single sign on, and the like. In practice, a large number of different client devices can access the server(s) 110.

The system 100 and any of the other systems described herein can be implemented in conjunction with any of the hardware components described herein, such as the computing systems described below (e.g., processing units, memory, and the like). In any of the examples herein, the inputs, outputs, templates, user profiles, and components can be stored in one or more computer-readable storage media or computer-readable storage devices. The technologies described herein can be generic to the specifics of operating systems or hardware and can be applied in any variety of environments to take advantage of the described features.

Example Method for Implementing a User-Driven Evolving User Interface

Figure 2:
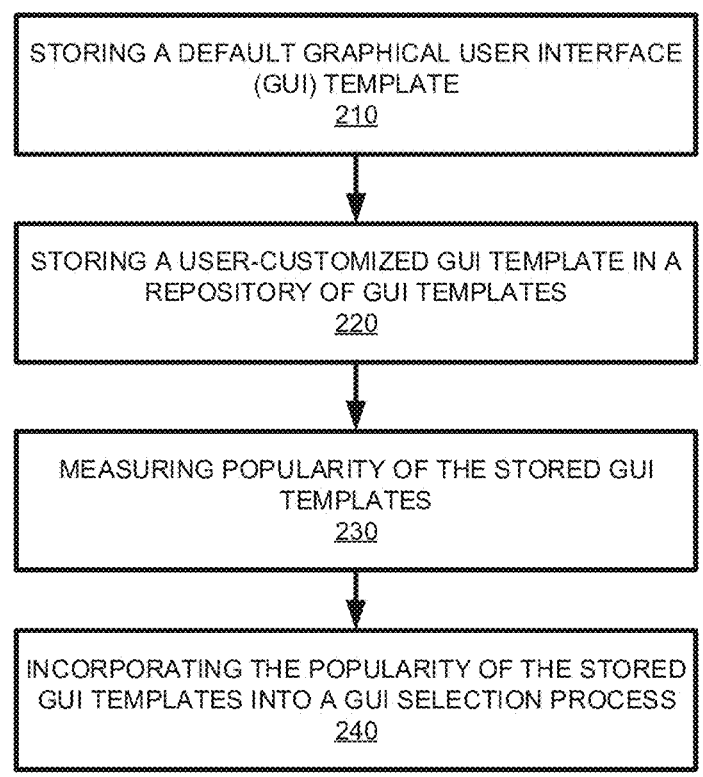
FIG. 2 is a flowchart of an example method for a user-driven customizable evolving user interface.

FIG. 2 is a flowchart of an example method 200 for a user-driven customizable evolving user interface. At 210, a default GUI template can be stored. The default GUI template can define at least part of a graphical user interface to be presented to a user by a software application when the user has not customized the graphical user interface. The default GUI template can include multiple customizable elements that have default settings and are capable of being customized by a user. Multiple default GUI templates can be stored, and respective default GUI templates can be stored in association with one or more user attributes. Thus, different default GUI templates can be associated with different communities of users so that different users can be presented with different user interfaces when using the software application. For example, the default GUI templates can be stored in the default template(s) 150 and accessed by the application 140. The default GUI templates can define at least part of a graphical user interface presented to the users of client devices 120-122 when the users are interacting with the application 140.

At 220, a user-customized GUI template can be stored in a repository of GUI templates. For example, when the user starts the software application, the user is presented with an initial user interface that is defined by the default GUI template (such as when the user has not customized the user interface) or by a user-customized GUI template (such as when the user has previously customized the user interface). The user can manually customize the initial user interface or select a pre-customized GUI template. The user's customizations can generate a new user-customized GUI template that includes one or more customized elements that differ from the initial GUI template. The customized elements reflect the user's changes to the user interface. The user can save the customizations causing the new user-customized GUI template to be stored in the repository of GUI templates. The user's profile can be updated to reference the new user-customized GUI template so that the user can see the customized user interface the next time the user starts the application. One or more of the user's attributes can be stored in association with the new user-customized GUI template. Other metadata, such as the creation date or a theme, can be also be stored in association with the new user-customized GUI template. The metadata and the user's attributes can be used as a key for other users to search on and for creating different popularity measures.

At 230, the popularity of the stored GUI templates can be measured. The popularity can be measured for the entire user base of the application or it can be personalized to a user, based on one or more of the user's attributes and/or search criteria provided by the user. For example, measuring the popularity can include tracking a number of users that have selected the stored GUI templates. The number of users using the default GUI templates can be increased when a new user registers or begins using the respective default GUI templates. The number of users using the default GUI templates can be decreased when a respective user customizes the user interface and stops using the default GUI templates. The number of users using a user-customized GUI template can be increased when a user selects the user-customized GUI template and decreased when the user stops using the user-customized GUI template (such as when the user creates a new user-customized GUI template or when the user does not use the application within a threshold amount of time).

The popularity can be personalized to a user, based on one or more of the user's attributes and/or search criteria provided by the user. For example, the popularity can be personalized to a particular user based on the user attributes associated with the stored GUI templates and user attribute values associated with the particular user. In other words, the popularity can be measured amongst the community of users that have one or more similar user attributes to the particular user. Users can rate the stored GUI templates, and the ratings can be incorporated into the popularity measure. Thus, the users can collaborate through the rating system. The user can enter search criteria and the popularity measure can be based on the popularity of stored GUI templates matching the search criteria. For example, the user can search for templates that are popular amongst German teenagers.

At 240, the popularity of the stored GUI templates can be incorporated into a GUI selection process. The GUI selection process can include recommending or providing a set of stored GUI templates for the user to select and evolving the default GUI template. For example, as part of the GUI selection process, the stored GUI templates can be ranked according to popularity. The stored GUI templates can be presented to the user with more popular templates presented before less popular templates.

The default GUI template can be automatically evolved based on the popularity of the stored GUI templates. Evolution of the default GUI template can include changing the default setting of a customizable element of the default GUI template to match a customized setting of a corresponding customizable element of the stored GUI templates. For example, at a pre-set time or when a stored GUI template or customizable element reaches a popularity threshold, the default GUI template can be modified or a new default GUI template can be created so that the default setting of the customizable element is changed to the popular setting.

Another Example System Implementing a User-Driven Evolving User Interface

Figure 3:
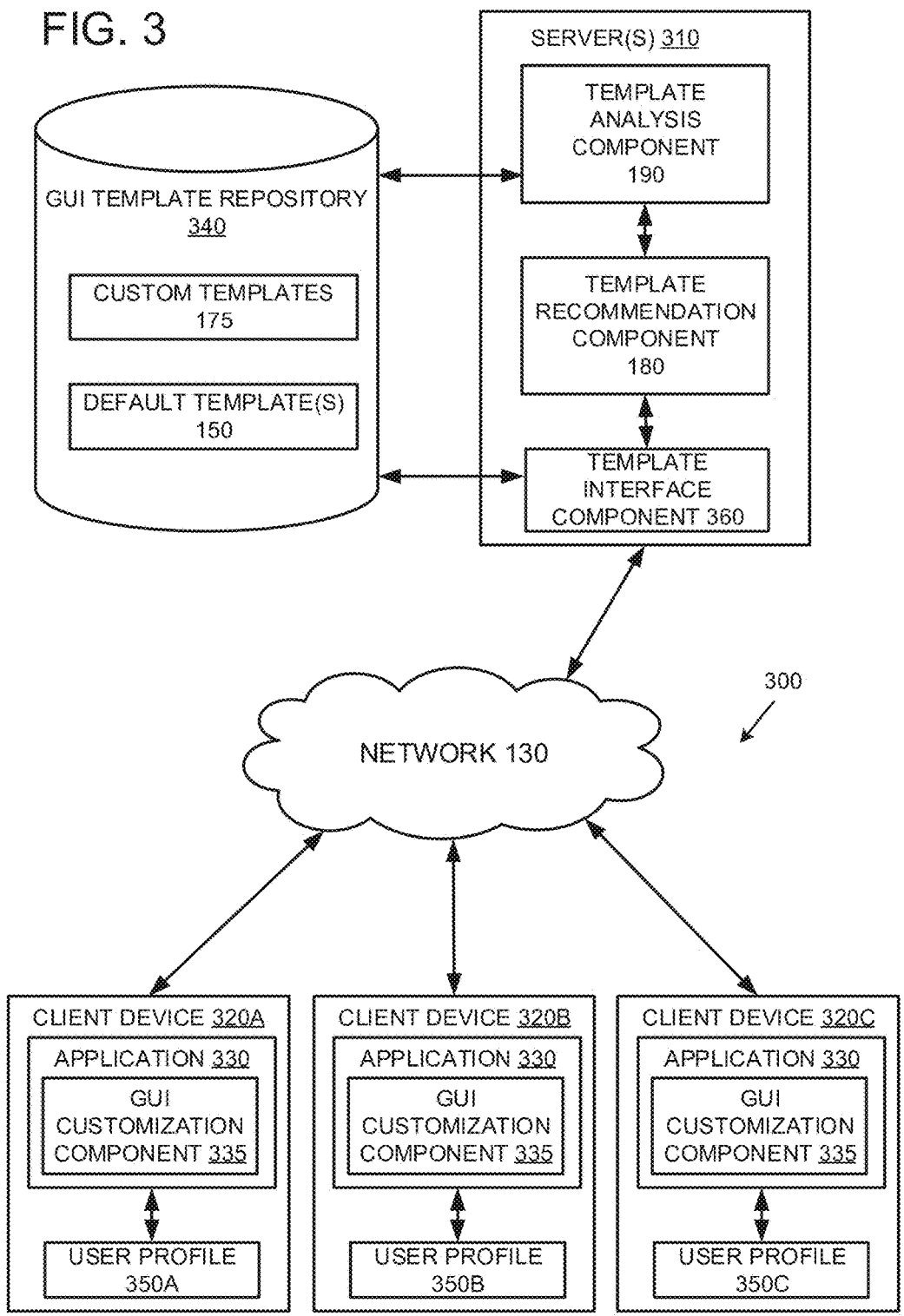
FIG. 3 is a block diagram of another example system implementing a user-driven customizable evolving user interface.

FIG. 3 is a block diagram of an example system 300 implementing a user-driven customizable evolving user interface. System 100 of FIG. 1 and system 300 of FIG. 3 share some components, and where the components are similar, they are not discussed in depth with reference to FIG. 3. Systems like system 100 are sometimes referred to as "thin client" systems where much of the processing occurs on the computer servers 110, and systems like system 300 are sometimes referred to as "fat client" systems where much of the processing occurs on the clients 320A-C. It should be understood that systems designers can choose to put some components on either the server or the client or they can distribute the functions of the components across the server and the client.

The system 300 can include one or more computer servers 310 connected over a communications network 130 to one or more client devices, such as client devices 320A-C, for example. The client devices 320A-C can include various types of clients, such as desktop computers, laptops, tablets, smartphones, set-top boxes, game consoles, and smart televisions running web browsers and/or other client applications. The client devices 320A-C can include various types of input and output devices which can be used to implement a user interface of an application 330 executing on respective client devices 320A-C.

The application 330 can include a graphical user interface for interfacing with a user. The look, feel, and operation of the graphical user interface can be defined by one or more GUI templates, such as the default template(s) 150 and the custom templates 175 stored in the GUI template repository 340. The respective user profiles 350A-C can be referenced by the application 330 to determine which GUI template to use for a particular user of the respective client device 320A-C. For example, if a user of client device 320A has not customized the user interface yet, then the user profile 350A may indicate that a GUI template from the default template(s) 150 should be used for that particular user. However, if the user of client device 320A has customized the user interface, then the user profile 350A may indicate that a GUI template from the custom templates 175 should be used for that particular user. The application 330 can retrieve the appropriate GUI template from the GUI template repository 340 by communicating with the template interface component 360. Alternatively or additionally, the appropriate GUI template can be stored or cached on the client device 320A.

The GUI template repository 340 can be a source of data for the template analysis component 190 and/or software developers of the application 330. For example, the template analysis component 190 can measure the popularity of the GUI templates stored in the GUI template repository 340. Similarly, software developers can mine the GUI template repository 340 for information about the GUI templates so that future user interfaces can potentially be improved. Additionally or alternatively, the template analysis component 190 can automatically, and/or upon request, generate reports for the software development team regarding the popularity of the templates stored in the GUI template repository 340.

The user can customize the user interface of the application 330 by completing a GUI selection process. For example, the GUI customization component 335 can be used to allow the user to customize the graphical user interface via manual customization (e.g., changing the default state of one or more elements of the GUI template) or by selecting a pre-customized template, such as one of the GUI templates stored in the GUI template repository 340. As one example, user attributes stored in the respective user profiles 350A-C can be communicated to the template recommendation component 180 so that a popularity and ranking of the stored GUI templates can be generated for the user. The popularity of the stored GUI templates can be incorporated into the GUI selection process, such as by providing the user with an ordered list of the most popular GUI templates. When the user completes the customization of the user interface, the corresponding customized GUI template can be uploaded to the GUI template repository 340 and potentially shared by the other users of the application. Sharing can be required, such as by requiring sharing in the license agreement for the software, or permission to share can be requested when the software is registered or when the customized GUI template is uploaded. If permission is granted, user attributes from the respective user profiles 350A-C can be stored in association with uploaded template.

Example Graphical User Interface Template

Figure 4:
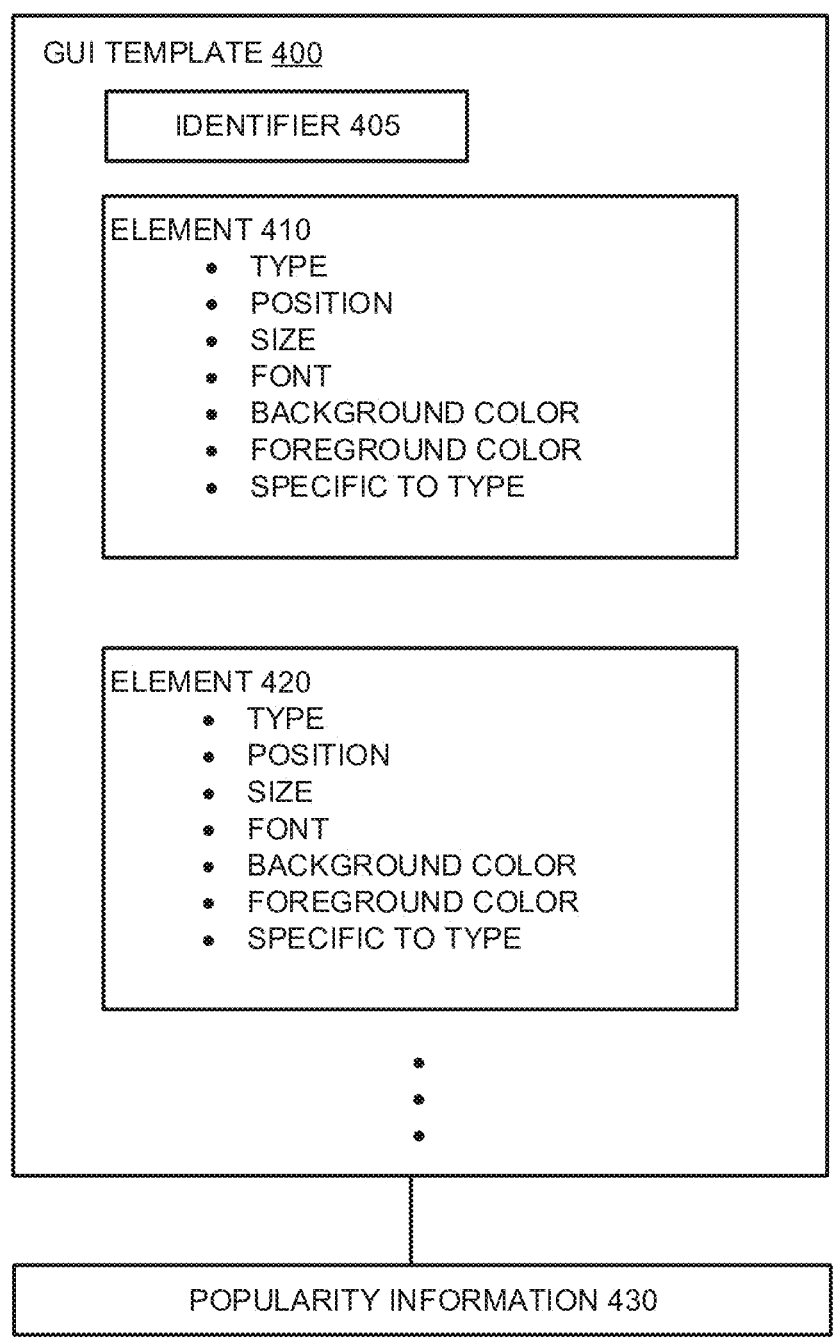
FIG. 4 is an example of a graphical user interface template.

FIG. 4 is an example of a graphical user interface template 400. The GUI template 400 can include an identifier 405 for differentiating one GUI template from another GUI template. The GUI template 400 can define a complete user interface or a portion of the user interface. For example, the GUI template 400 can define a single page, a portion of a page, or multiple pages of a user interface. The pages can include various objects, such as images, text, windows, controls, scripts, and other information suitable for communicating with the user. The GUI template 400 can include one or more customizable elements, such as elements 410 and 420, where the elements can correspond to the objects on a page or to other GUI templates, for example. The customizable elements can have a default setting and can be customized by a user. The GUI template 400 can also include elements that are not customizable.

The customizable elements 410, 420 of the GUI template 400 can include multiple fields for determining characteristics of the respective customizable elements 410, 420. Some fields can be common for all elements and other fields can be specific to a type of element. For example, the elements can include a type field to describe the type of element. Exemplary types include a window, text, an image, a control, a script, a GUI template (the GUI templates can be hierarchical). A position field can describe an absolute or relative position on a screen and/or a layer to differentiate foreground and background objects, for example. A size field can describe a size of the element, such as by giving dimensions in the x and y coordinates. A font field can describe a font for text used in the element, including a font type (e.g., Times New Roman, Arial, or Sans Serif), a font size, and any effects (such as bold, underline, or italics). A background color field and a foreground color field can describe background and foreground colors, respectively. Control types can have fields that describe how the control should work. For example, a control-mode field can determine whether the control is displayed as a dropdown box, radio buttons, or a text input field. A tooltip field can be used to determine whether tooltips are displayed when a user hovers over the object.

The user can customize the GUI template 400 by changing the default setting of one or more fields of the elements 410, 420 and/or by adding new elements or by removing existing elements. For example, the user can customize the user interface by adding a new widget, such as a stock ticker, resulting in an element corresponding to the stock ticker being added to the GUI template 400. As another example, the user can remove objects from the user interface resulting in the corresponding element being removed from the GUI template 400. One example of changing a default setting is when the user customizes the user interface by moving an element from one area of the screen to another area of the screen, resulting in the position field being updated. Another example of changing a default setting is when the user customizes the user interface by changing a control from a dropdown box to radio buttons, resulting in the control-mode field being updated.

The GUI template 400 can be stored in association with popularity information 430. For example, the popularity information 430 can include a count of the number of users using the GUI template 400. The count can be broken down based on user attributes and/or ratings provided by the users. Specifically, a first count can indicate the number of users having a first attribute and a second count can indicate the number of users having a second attribute. The popularity information 430 can include an average ranking for all users and/or for the users having a particular attribute.

Figure 5:
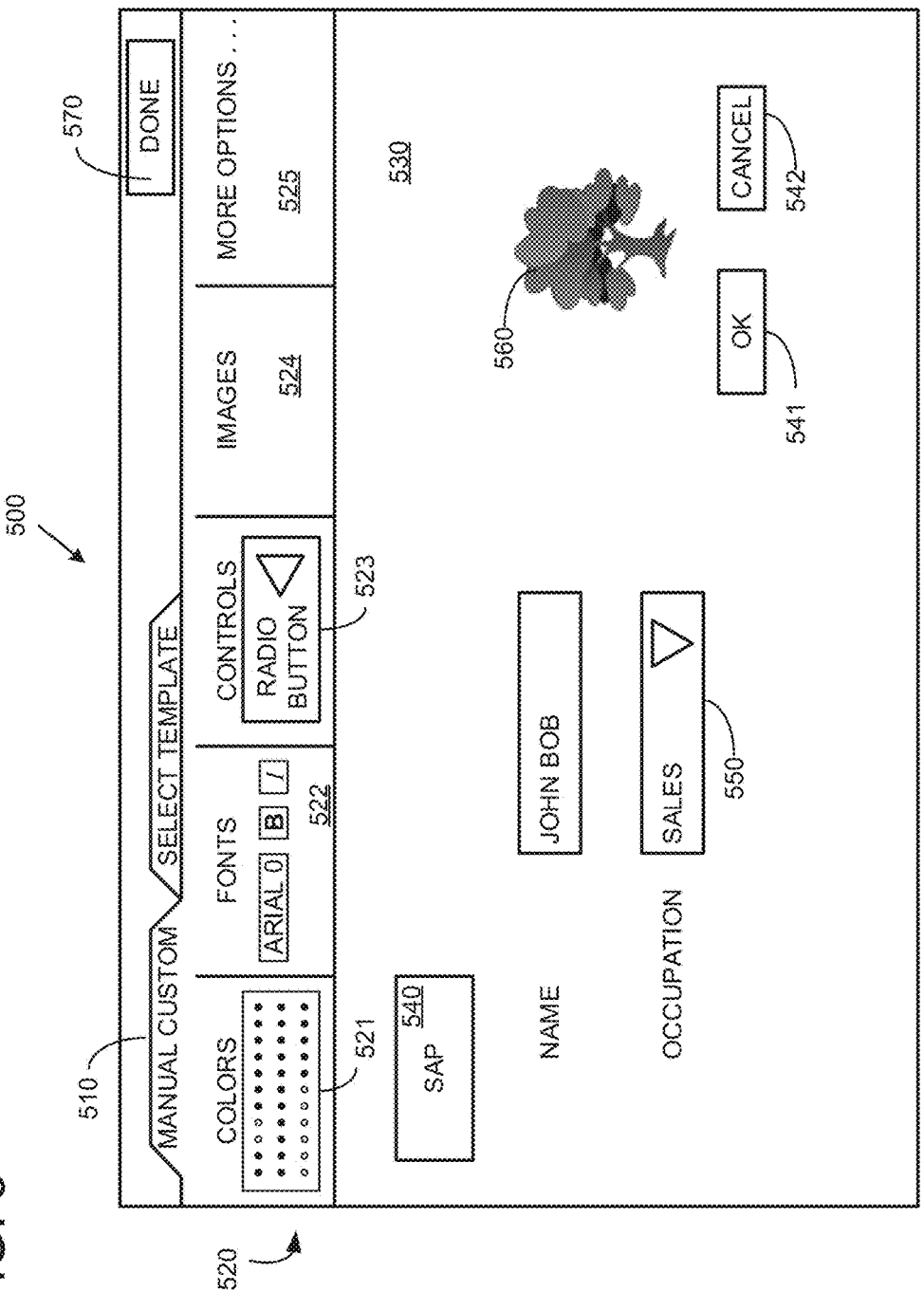
FIG. 5 is an example screen for manually customizing one or more elements of a user interface.

Example Screen for Manually Customizing One or More Elements of a User Interface FIG. 5 is an example screen 500 for manually customizing one or more elements of a user interface. For example, a user can be running a software application and begin a GUI selection process. A manual customization mode can be entered, such as by clicking or touching the "manual custom" tab 510. It should be understood that a user interface can incorporate a touch screen (where the user can provide input by touching an area of screen with a finger or stylus) and/or a display screen paired with an input device such as mouse (where the user can provide input by moving the mouse to control a cursor on the screen and clicking on a button of the mouse). In this context, clicking and touching are generally equivalent.

When the manual customization mode is entered, the screen 500 can display the page 530 to customize and a ribbon or toolbar 520 having options that can be applied to customize the user interface. The page 530 can include objects that correspond to elements of a GUI template. Some of the objects can be customizable, and some of the objects may be fixed. For example, the software vendor logo 540 and buttons 541 and 542 may be fixed and non-customizable. A drop-down list 550 can be customizable. For example, the user can select the drop-down list 550, such as by clicking on it. The user can change the user interface control type by selecting an option from the controls menu 523. For example, when the user hovers or clicks on the controls menu 523, a list of different control types can be provided, and the user can click on the desired control type. Thus, the user can change the drop-down list 550 to a radio button, list item, or other control type by selecting the desired control type from the controls menu 523. When the user changes or customizes an object on the page, the corresponding element of the GUI template can be modified to reflect the change. Specifically, the default setting of the corresponding customizable element can be changed to reflect the customization.

The color palette 521 can be used to change the default color setting of an element of the GUI template. For example, an individual color from the color palette 521 can be dragged and dropped onto an object of the page 530 to customize the color of the object. Additionally or alternatively, an object of the page 530 can be selected and then the individual color from the color palette 521 can be clicked to customize the color of the object. The fonts tool 522 can be used to change the default font of text of an element of the GUI template. For example, an object of the page 530 can be selected and then the type, size, and/or effect of the font can be input into the fonts tool 522 to customize the font of text of the object. The images tool 524 can be used to change aspects of an image (such as image 560) corresponding to an element of the GUI template. For example, the image 560 can be selected and the images tool 524 can be used to display text instead of images (such as by displaying the text in an "alt" or "title" tag instead of the image) or to show the image at a different default compression quality. For example, a user may desire to have lower quality images displayed to reduce the bandwidth of communications from a remote server. Additional options are possible as indicated by more options 525. For example, a trashcan can be used to delete items from the page 530, such as when a user drags and drops an item in the trashcan. As another example, widget builder can list widgets that can be added to the page 530 and the user can add an item by dragging a widget from the list onto the page 530. Items on the page 530 can be repositioned, such as by hovering over or selecting the item and the dragging the item to a different position on the page 530.

When the user is finished with customizing the user interface, the user can click on the done button 570, for example. Completing the customization can cause a new GUI template to be created (incorporating all of the user's customizations) and to have the GUI template uploaded to the GUI template repository. The new GUI template can be analyzed and be made available to the community of users.

Example Screen for Selecting a Customized User Interface

Figure 6:
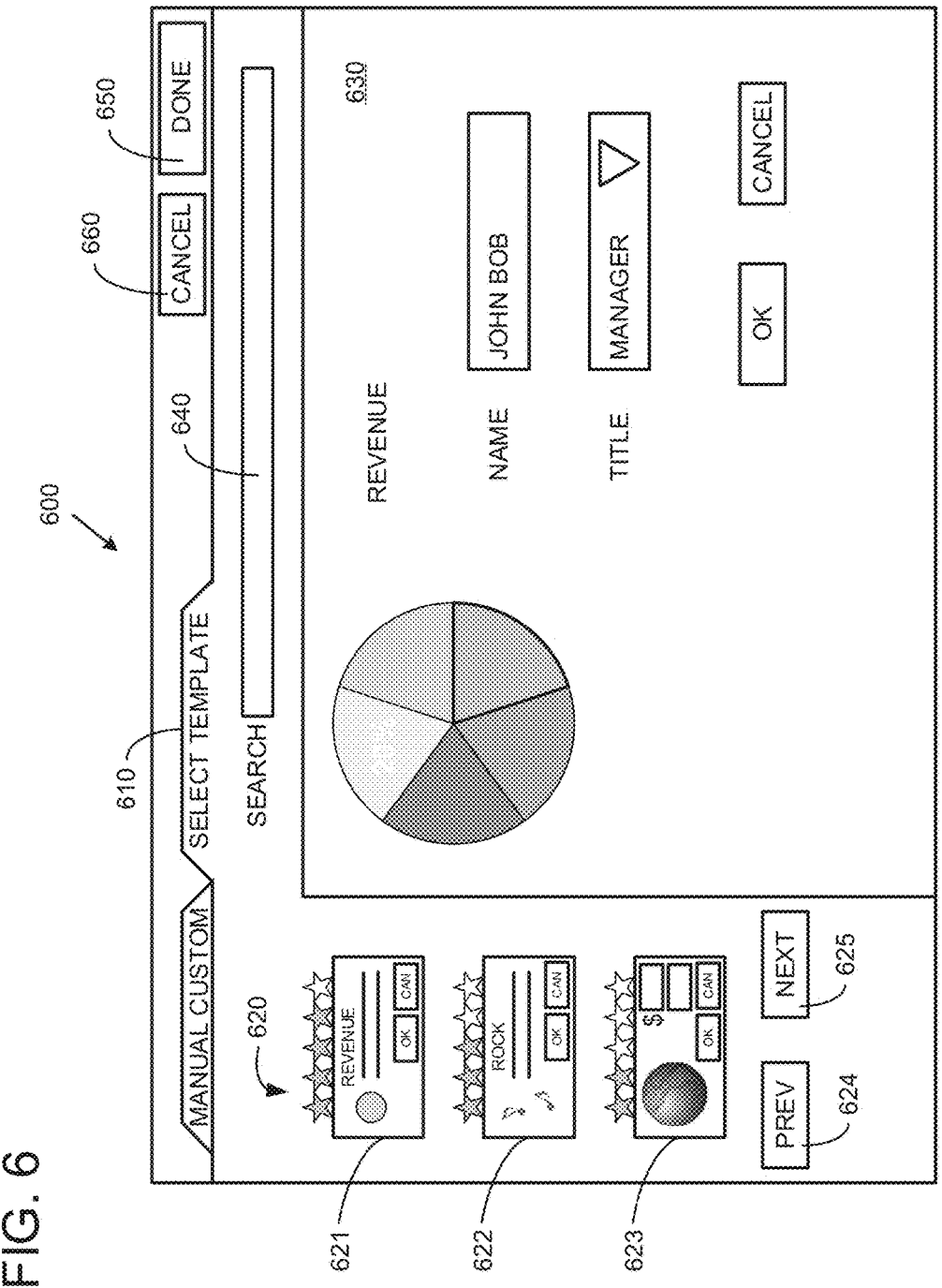
FIG. 6 is an example screen for selecting a customized user interface from a repository of customized user interfaces.

FIG. 6 is an example screen 600 for selecting a customized user interface from a repository of customized user interfaces. For example, a user can be running a software application and begin a GUI selection process. A template selection mode can be entered, such as by clicking or touching the "select template" tab 610. When the template selection mode is entered, the screen 600 can display the page 630 to customize and a list of popular templates 620. For example, the list of popular templates 620 can include the three most popular templates 621-623. The three most popular templates 621-623 can be a subset of the templates retrieved from the GUI template repository. For example, the client device can transmit a request to a remote server to retrieve the templates. The request can include user attributes, search criteria, and/or other suitable information for retrieving the templates.

The list of popular templates 620 can include a rating for the respective templates of the list. For example, the rating can be the average rating given by the users of the template or a rating that is weighted by user preferences and/or attributes. For example, the rating can be based on the user's past selections of templates, a list of the user's likes or dislikes, or other suitable criteria.

The user can sample or observe the effects of a candidate template by selecting (e.g., clicking on or touching) the template from the list of popular templates 620. When the user selects the template, the page 630 can be refreshed according to the selected template. If the user does not like the templates in the list of popular templates 620 of if the user merely wants to browse other templates, the user can click on the next button 625 to get the next most popular templates. For example, clicking on the next button 625 can cause a request to be transmitted from the client device to the remote server to retrieve the next most popular templates. Thus, the more popular templates can be communicated before the less popular templates, saving the user time during the selection process and saving on bandwidth between the client device and the server (since fewer templates will likely be communicated to the client compared to if the templates were not ordered by popularity). The user can navigate back and forth through the list of candidate templates by clicking the next button 625 to see less popular candidates and clicking the "prev" (previous) button 624 to see more popular candidates.

The user can search for specific qualities of the templates or can search for templates that are popular amongst various communities of users by entering search criteria into the search field 640. For example, the user can search for templates that are popular amongst female teenagers by typing "female teenagers" into the search field 640. As another example, the user can search for templates with stock tickers by typing "stock ticker" into the search field 640.

When the user wants to finalize a selection of template to customize the user interface, the user can click on the done button 650 when the desired template has been selected, for example. The application can prompt the user to rate the selection during finalization or at a later time. Completing the customization can cause the user interface to be updated as defined by the selected GUI template and the popularity measure of the selected GUI template to be updated. If the user chooses to abort the customization, the user can click the cancel button 660, for example.

Another Example Screen for Selecting a Customized User Interface

Figure 7:
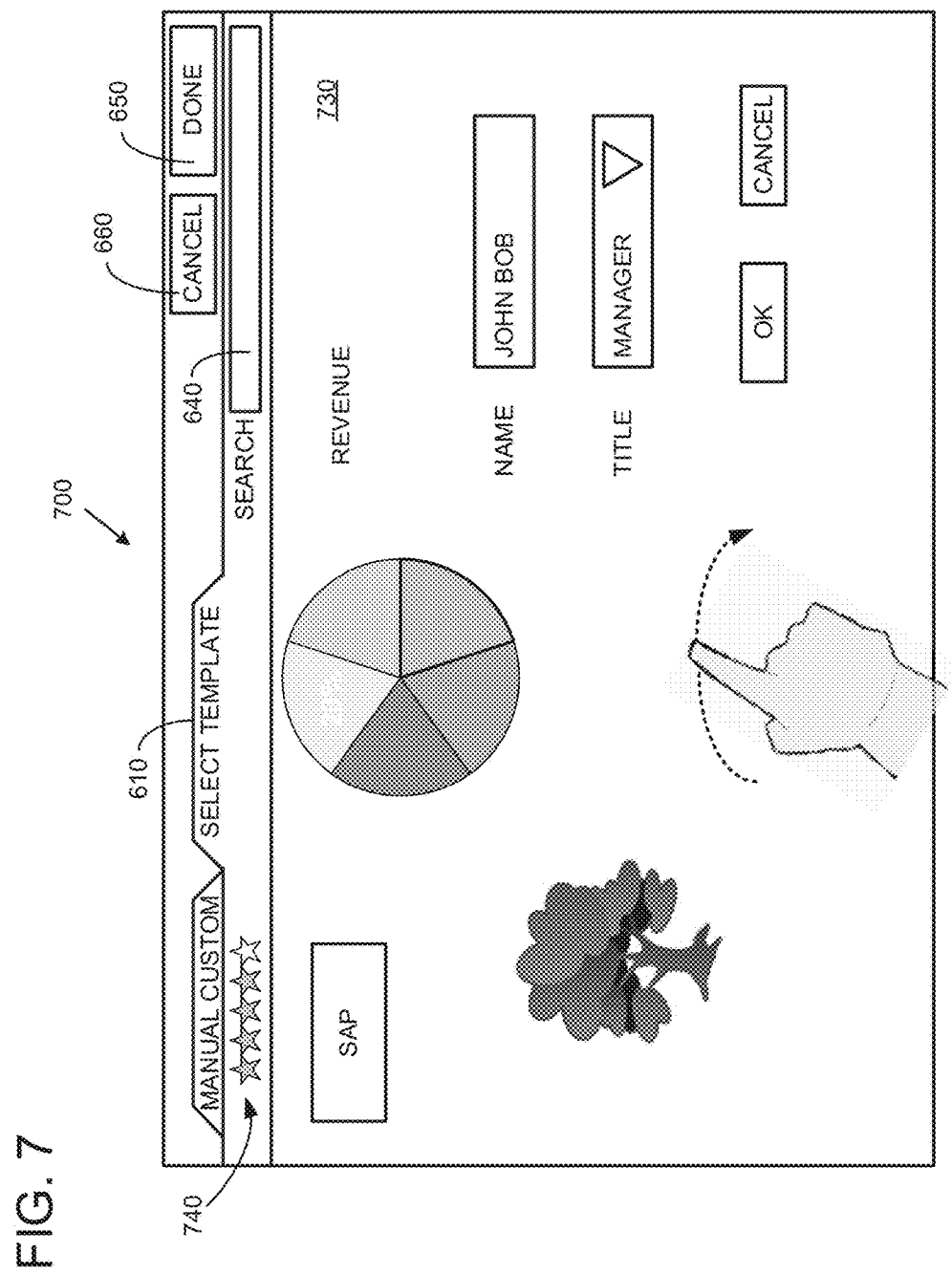
FIG. 7 is another example screen for selecting a customized user interface from a repository of customized user interfaces.

FIG. 7 is another example screen 700 for selecting a customized user interface from a repository of customized user interfaces. For example, a user can be running a software application and begin a GUI selection process. A template selection mode can be entered, such as by clicking or touching the "select template" tab 610. When the template selection mode is first entered, the screen 700 can display the page 730 to customize according to the definition provided by the most popular candidate GUI template. Thus, the user can see what the page 730 looks like when the most popular candidate GUI template is applied. The user can look at other candidate templates by swiping the user's hand or the mouse across the screen to move to the next candidate template. Swiping in one direction can change the candidate template to a more popular template and swiping in the opposite direction can change the candidate template to a less popular template. A rating 740 of the candidate template can be provided to potentially help the user decide whether to select the template. The user can select the candidate template by clicking or touching the done button 650 when the user interface defined by the candidate template is displayed.

Example Method for Customizing a Graphical User Interface

Figure 8:
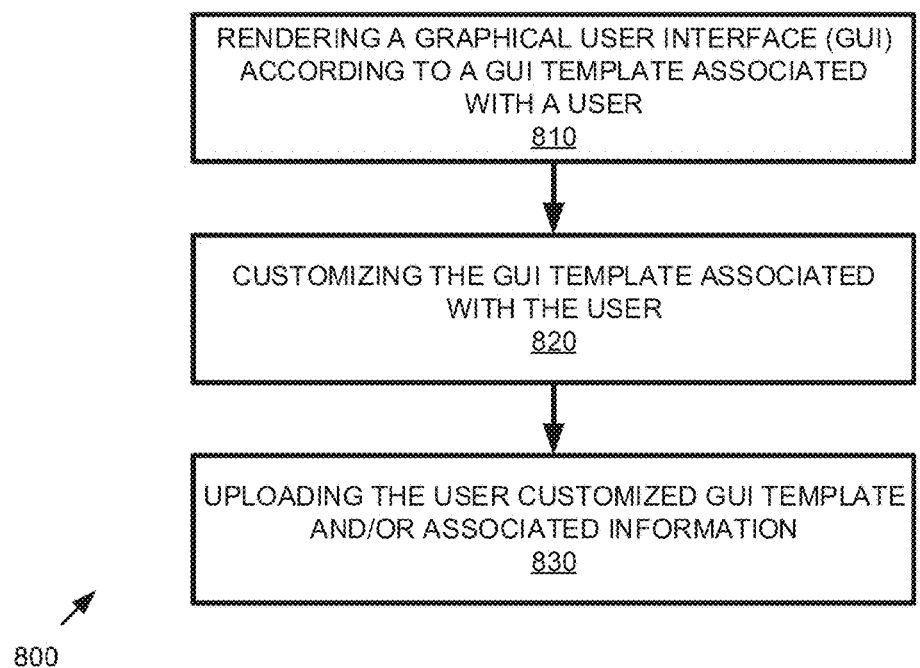
FIG. 8 is a flowchart of an example method for customizing a graphical user interface.

FIG. 8 is a flowchart of an example method for customizing a graphical user interface of a software application. At 810, the GUI can be rendered according to a GUI template associated with a user. For example, if the user has not customized the GUI, the GUI can be rendered as defined by a default GUI template. The default GUI template can be stored in a GUI template repository or elsewhere. However, if the user has customized the GUI, the GUI can be rendered as defined by a user-customized GUI template.

At 820, the GUI template associated with the user can be customized. For example, the user can be running the software application and complete a GUI selection process. The GUI selection process can include manual customization (such as described with reference to FIG. 5), selecting a customized GUI template from a repository of customized GUI templates (such as described with reference to FIGS. 6 and 7), and accepting an evolved default GUI template (such as by explicitly agreeing to upgrade to the evolved GUI template or by automatically upgrading to the evolved GUI template).

At 830, the user-customized GUI template and/or associated information can be uploaded. For example, a new user-customized GUI template can be uploaded after the user manually customizes the GUI template. User attributes and/or user ratings can be uploaded so that a popularity measure of the user-customized GUI template can be updated.

Example Computing Environment

Figure 9:
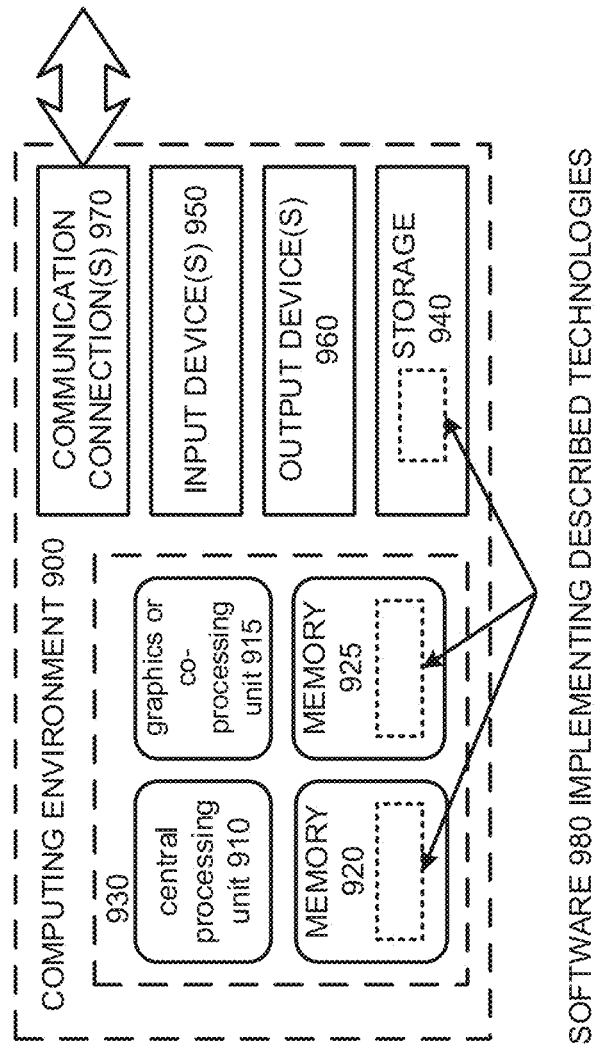
FIG. 9 depicts a generalized example of a suitable computing environment in which the described innovations may be implemented.

FIG. 9 depicts a generalized example of a suitable computing environment (e.g., computing system) 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.).

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein. For example, the rules engine and others described herein can be the software 980 executed from the memory 920.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although direct connection between computer systems is shown in some examples, in practice, components can be arbitrarily coupled via a network that coordinates communication.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

Example Cloud-Supported Environment

Figure 10:
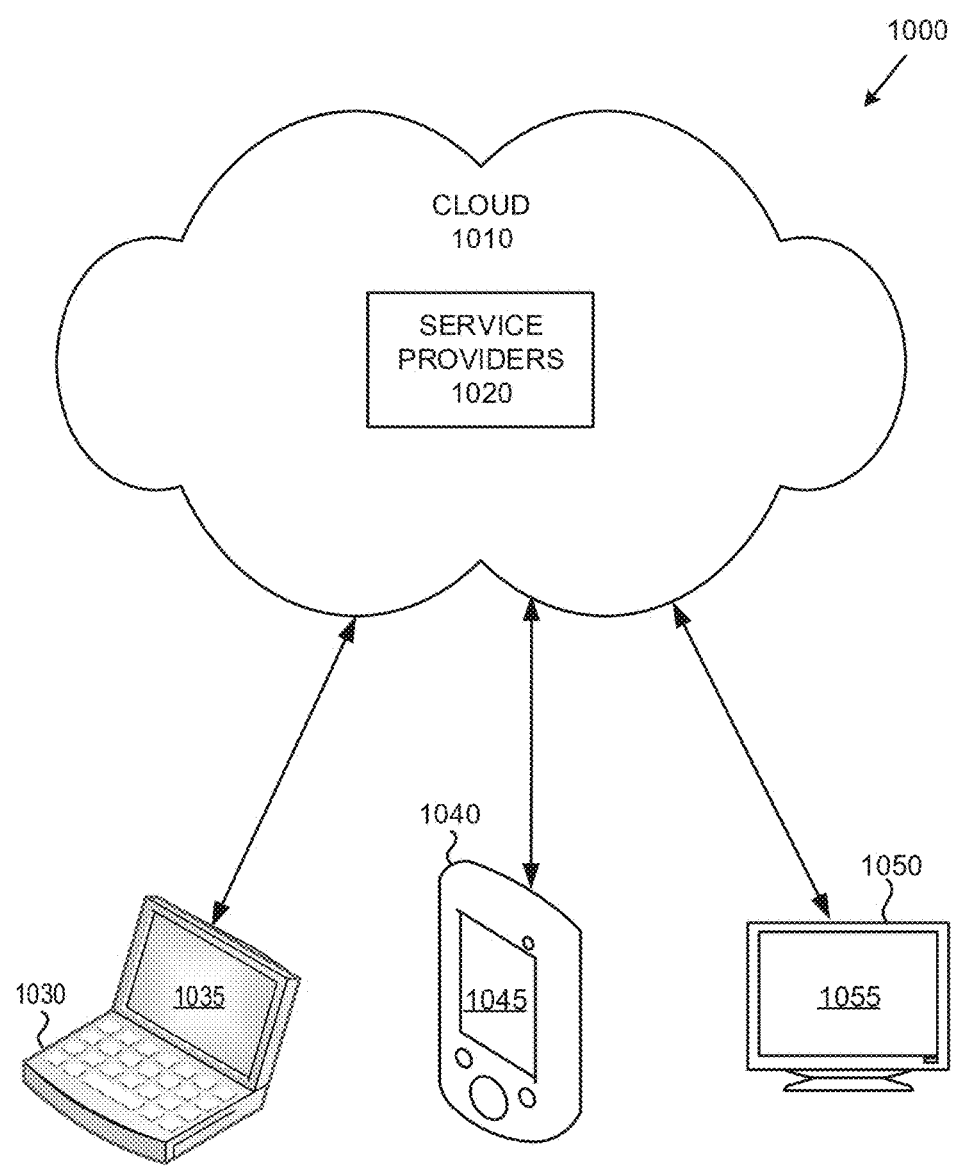
FIG. 10 is an example cloud-support environment that can be used in conjunction with the technologies described herein.

FIG. 10 is an example cloud-support environment that can be used in conjunction with the technologies described herein. In example environment 1000, the cloud 1010 provides services for connected devices 1030, 1040, 1050 with a variety of screen capabilities. Connected device 1030 represents a device with a computer screen 1035 (e.g., a mid-size screen). For example, connected device 1030 could be a personal computer such as desktop computer, laptop, notebook, netbook, or the like. Connected device 1040 represents a device with a mobile device screen 1045 (e.g., a small size screen). For example, connected device 1040 could be a mobile phone, smart phone, personal digital assistant, tablet computer, and the like. Connected device 1050 represents a device with a large screen 1055. For example, connected device 1050 could be a television screen (e.g., a smart television) or another device connected to a television (e.g., a set-top box or gaming console) or the like. One or more of the connected devices 1030, 1040, 1050 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1000. For example, the cloud 1010 can provide services for one or more computers (e.g., server computers) without displays.

Services can be provided by the cloud 1010 through cloud service providers 1020, or through other providers of online services (not depicted). For example, cloud services can be customized to the screen size, display capability, and/or touch screen capability of a particular connected device (e.g., connected devices 1030, 1040, 1050).

In example environment 1000, the cloud 1010 provides the technologies and solutions described herein to the various connected devices 1030, 1040, 1050 using, at least in part, the service providers 1020. For example, the service providers 1020 can provide a centralized solution for various cloud-based services. The service providers 1020 can manage service subscriptions for users and/or devices (e.g., for the connected devices 1030, 1040, 1050 and/or their respective users).

Non-Transitory Computer-Readable Media

Any of the computer-readable media herein can be non-transitory (e.g., memory, magnetic storage, optical storage, solid-state drives, or the like).

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more computer-readable media (e.g., computer-readable storage media or other tangible media). Such instructions can cause a computer to perform the method. The technologies described herein can be implemented in a variety of programming languages.

Methods in Computer-Readable Storage Devices

Any of the methods described herein can be implemented by computer-executable instructions stored in one or more computer-readable storage devices (e.g., memory, magnetic storage, optical storage, solid-state drives, or the like). Such instructions can cause a computer to perform the method.

ALTERNATIVES

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. I therefore claim as my invention all that comes within the scope and spirit of the claims.

What is claimed is:

1. A method implemented at least in part by a computing system, the method comprising:
   storing a default graphical user interface template, the default graphical user interface template comprising multiple customizable elements having default settings and capable of being customized by a user;
   storing a user-customized graphical user interface template in a repository of user-customized graphical user interface templates, the user-customized graphical user interface template comprising one or more customized elements that differ from the default graphical user interface template;
   receiving a rating provided by another user of the user-customized graphical user interface template;
   measuring popularity of the user-customized graphical user interface template in the repository of user-customized graphical user interface templates, the popularity based on the rating provided by the other user of the user-customized graphical user interface template; and
   automatically evolving the default graphical user interface template based, at least in part, on the popularity of the user-customized graphical user interface template, wherein automatically evolving comprises modifying the default graphical user interface template.

2. The method of claim 1, wherein automatically evolving the default graphical user interface template comprises changing the default setting of a customizable element of the default graphical user interface template to match a customized setting of a corresponding customizable element of the user-customized graphical user interface template determined to be a popular customized element.

3. The method of claim 1, wherein measuring popularity of the user-customized graphical user interface template further comprises tracking a number of users that have selected the user-customized graphical user interface template.

4. The method of claim 1, further comprising:
   receiving a selection of a user-customized graphical user interface template; and
   incorporating the selection of the user-customized graphical user interface template into the measure of popularity of the user-customized graphical user interface template.

5. The method of claim 1, wherein the default graphical user interface template is stored in association with one or more user attributes and the default graphical user interface template defines at least part of a graphical user interface presented to a particular user identifier having the one or more user attributes when the user identifier has not customized the graphical user interface.

6. The method of claim 1, wherein:
the user-customized graphical user interface template is stored as associated with one or more user attributes; and
popularity is based on user attributes associated with the user-customized graphical user interface template.

7. The method of claim 1, further comprising:
receiving a request for a requesting user identifier to change a default graphical user interface template associated with the requesting user identifier; and
sending a subset of the graphical user interface templates for consideration based on popularity of the graphical user interface templates in the subset.

8. The method of claim 1, further comprising:
sending a recommendation to a particular user identifier to change a graphical user interface template associated with the particular user identifier to the evolved default graphical user interface template.

9. The method of claim 1, wherein automatically evolving the default graphical user interface template occurs when a stored user-customized graphical user interface template reaches a popularity threshold.

10. The method of claim 1, wherein the evolved default graphical user interface template is associated with one or more user attributes.

11. One or more non-transitory computer-readable media comprising computer-executable instructions causing a computing system to perform a method comprising:
displaying a plurality of candidate user-customized graphical user interface templates for selection, wherein displaying incorporates a popularity of at least one of the candidate user-customized graphical user interface templates, wherein the popularity is personalized to a particular user based on user preferences of the particular user;
receiving a selection of a selected user-customized graphical user interface template out of the plurality of candidate user-customized graphical user interface templates;
implementing the selected user-customized graphical user interface template locally;
after implementing the selected user-customized graphical user template locally, receiving a user rating of the selected user-customized graphical user template; and
incorporating the user rating into the popularity of the selected user-customized graphical user template for other users considering the selected user-customized graphical user template.

12. The one or more non-transitory computer-readable media of claim 11, wherein displaying a plurality of candidate user-customized graphical user interface templates for selection comprises displaying the plurality of candidate user-customized graphical user interface templates at the same time and with a measure of popularity for respective candidate user-customized graphical user interface templates.

13. The one or more non-transitory computer-readable media of claim 11, wherein displaying a plurality of candidate user-customized graphical user interface templates for selection comprises displaying respective candidate user-customized graphical user interface templates sequentially with more popular candidates displayed before less popular candidates.

14. The one or more non-transitory computer-readable media of claim 11, wherein:
respective candidate user-customized graphical user interface templates are associated with one or more user attributes; and
popularity is personalized to a particular user identifier based on the one or more user attributes associated with the respective candidate user-customized graphical user interface templates and user attribute values associated with the particular user identifier.

15. The one or more non-transitory computer-readable media of claim 11, wherein the method further comprises:
receiving a request to retrieve a plurality of candidate user-customized graphical user interface templates matching one or more user attributes entered by a user; and
transmitting the request to retrieve the plurality of candidate user-customized graphical user interface templates.

16. The one or more non-transitory computer-readable media of claim 11, wherein the method further comprises:
transmitting a request to retrieve a plurality of candidate user-customized graphical user interface templates matching one or more user attributes associated with a user identifier.

17. The one or more non-transitory computer-readable media of claim 11, wherein the user rating of the selected user-customized graphical user template is based on a measure of the user's satisfaction with the selected user-customized graphical user template.

18. The one or more non-transitory computer-readable media of claim 11, wherein:
respective candidate user-customized graphical user interface templates are associated with one or more user attributes; and
popularity is personalized to a particular user identifier based on the user attributes associated with the user-customized graphical user interface template, user attribute values associated with the particular user identifier, and ratings provided by other users selecting the user-customized graphical user interface template having one or more of same user attribute values as the particular user identifier.

19. A computing device configured to perform a method, the method comprising:
entering a graphical user interface selection mode and transmitting a request for candidate user-customized graphical user interface templates, respective candidate user-customized graphical user interface templates defining at least one characteristic of a page of a software application, the request including one or more user attributes associated with a particular user;
receiving the candidate user-customized graphical user interface templates, the candidate user-customized graphical user interface templates being popular among users having one or more of the transmitted user attributes associated with the particular user, wherein the popularity is personalized to the particular user based on a measure of satisfaction provided by the users having the one or more of the transmitted user attributes associated with the particular user;
displaying the page of the software application as defined by respective candidate user-customized graphical user interface templates, the page updating when the particular user swipes between the candidate user-customized graphical user interface templates;

receiving a selection of a selected user-customized graphical user interface template from the candidate user-customized graphical user interface templates; and implementing the selected user-customized graphical user interface template locally.

20. A computing device configured to perform the method of claim 19, the method further comprising:

allowing the particular user to further customize the selected user-customized graphical user interface template via manual customization; and requesting permission to share the further customized selected user-customized graphical user interface template with other users.

* * * * *